US012631870B2

(12) United States Patent (10) Patent No.: US 12,631,870 B2
Oshima et al. (45) Date of Patent: May 19, 2026

(54) ACTUATOR WITH A MIRROR PROVIDED WITH A PERMANENT MAGNET

(71) Applicants:Pioneer Corporation, Bunkyo-ku (JP); Pioneer Smart Sensing Innovations Corporation, Bunkyo-ku (JP)

(72) Inventors: Seiro Oshima, Kawagoe (JP); Tomotaka Yabe, Kawagoe (JP); Shingo Iwasaki, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 261 days.

(21) Appl. No.: 18/278,596

(22) PCT Filed: Mar. 1, 2022

(86) PCT No.: PCT/JP2022/008511
§ 371 (c)(1),
(2) Date: Aug. 23, 2023

(87) PCT Pub. No.: WO2022/186178
PCT Pub. Date: Sep. 9, 2022

(65) Prior Publication Data
US 2024/0126069 A1 Apr. 18, 2024

(30) Foreign Application Priority Data

Mar. 2, 2021 (JP) ................................. 2021-032420

(51) Int. Cl.
*G02B 26/08* (2006.01)
*G02B 26/10* (2006.01)
(52) U.S. Cl.
CPC ......... *G02B 26/085* (2013.01); *G02B 26/101* (2013.01)

(58) Field of Classification Search
CPC ... G02B 26/085; G02B 26/101; G02B 26/105
See application file for complete search history.

(56) References Cited

U.S. PATENT DOCUMENTS

2018/0373025 A1 * 12/2018 Miyatake ............. G02B 26/101
2021/0018601 A1 1/2021 Kitazawa

FOREIGN PATENT DOCUMENTS

JP 2009-069676 A 4/2009
JP 2016-092508 A 5/2016
(Continued)

OTHER PUBLICATIONS

International Search Report (with translation) and Written Opinion received in corresponding International Application No. PCT/JP2022/008511, mailed May 17, 2022, in 9 pages.

*Primary Examiner* — Euncha P Cherry
(74) *Attorney, Agent, or Firm* — Procopio, Cory, Hargreaves & Savitch LLP

(57) ABSTRACT

An actuator includes a mirror and an electromagnet. The mirror is provided with a permanent magnet and is capable of oscillating about a first axis and a second axis as oscillation axes with respect to a reference plane. The second axis is non-parallel to the first axis. The electromagnet has a yoke and a coil and applies a magnetic flux to the permanent magnet. Both ends of the yoke face each other at least partially across a gap. When viewed from a direction perpendicular to the reference plane, a center Cg of the gap does not overlap a center Cm of the permanent magnet. A current $I_1$ for causing the mirror to oscillate with respect to the first axis and a current $I_2$ for causing the mirror to oscillate with respect to the second axis are superimposed and flowed through the coil.

11 Claims, 9 Drawing Sheets

(56) References Cited

FOREIGN PATENT DOCUMENTS

| JP | 2021-033087 | A | 3/2021 |
| WO | 2019/172307 | A1 | 9/2019 |

* cited by examiner

CONTROL UNIT 70

ACTUATOR WITH A MIRROR PROVIDED WITH A PERMANENT MAGNET

CROSS-REFERENCE TO RELATED APPLICATIONS

This application is a U.S. national stage application of International Application No. PCT/JP2022/008511, filed Mar. 1, 2022, which claims priority to JP 2021-032420, filed Mar. 2, 2021, the contents of which are incorporated by reference.

TECHNICAL FIELD

The present invention relates to an actuator.

BACKGROUND ART

In a measurement apparatus or the like that uses light to scan and measure a predetermined region, a movable mirror is used to change the direction of light emission.

Patent Document 1 describes an optical scanner in which a permanent magnet fixed to a mirror interacts with an electromagnet to generate a driving torque on the mirror.

RELATED DOCUMENT

Patent Document

Patent Document 1: Japanese Unexamined Patent Publication No. 2009-69676

SUMMARY OF THE INVENTION

Technical Problem

Miniaturization of the actuator that drives the mirror is important for miniaturization of the entire measurement apparatus or the like including the actuator. On the other hand, when trying to drive the mirror with respect to two axes, two sets of electromagnets are required, and there is a problem that the size of the actuator increases.

One example of the problems to be solved by the present invention is to miniaturize an actuator that drives a mirror.

Solution to Problem

The invention according to claim 1 is an actuator including a mirror provided with a permanent magnet, and capable of oscillating about a first axis and a second axis non-parallel to the first axis as oscillation axes with respect to a reference plane, an electromagnet having a yoke and a coil and applying a magnetic flux to the permanent magnet, in which both ends of the yoke face each other at least partially across a gap, when viewed from a direction perpendicular to the reference plane, a center of the gap does not overlap a center of the permanent magnet, and a current for causing the mirror to oscillate with respect to the first axis and a current for causing the mirror to oscillate with respect to the second axis are superimposed and flowed through the coil.

DESCRIPTION OF EMBODIMENTS

Figure 1:
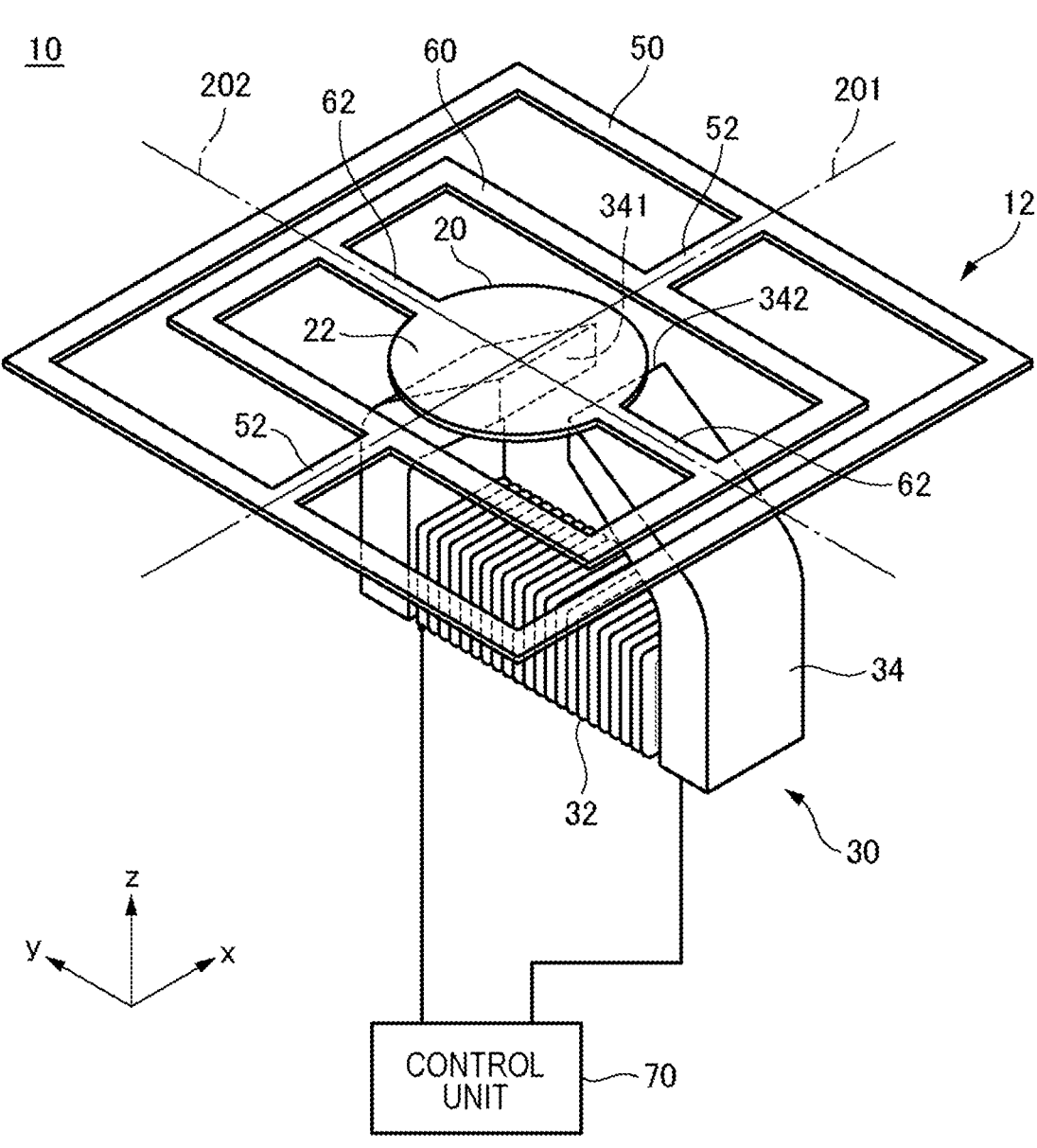
FIG. 1 is a diagram illustrating a configuration of an actuator according to an embodiment.

Hereinafter, an embodiment of the invention will be described with reference to the drawings. In addition, in all of the drawings, the same components are denoted by the same reference numerals, and the description thereof will not be repeated.

EMBODIMENT

Figure 2:
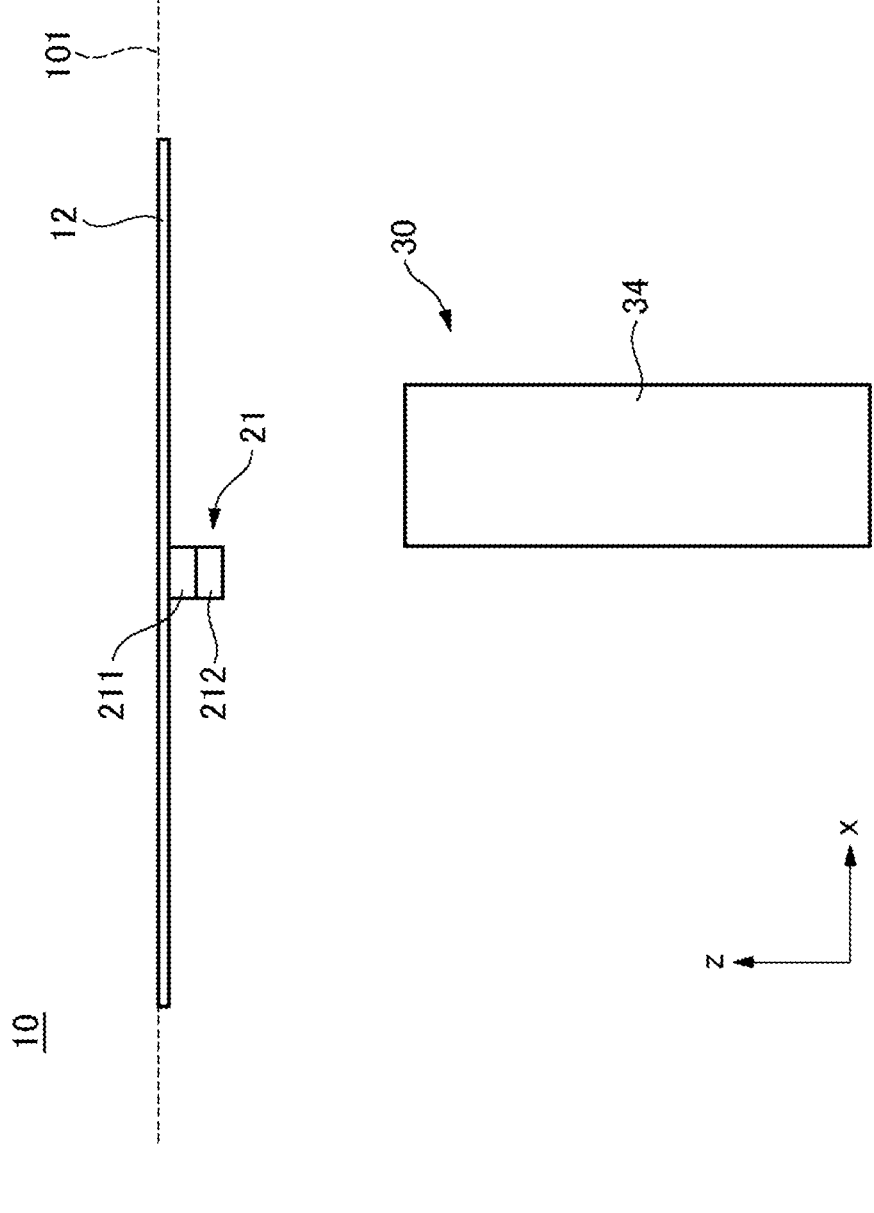
FIG. 2 is a diagram illustrating a configuration of the actuator according to the embodiment.
Figure 3:
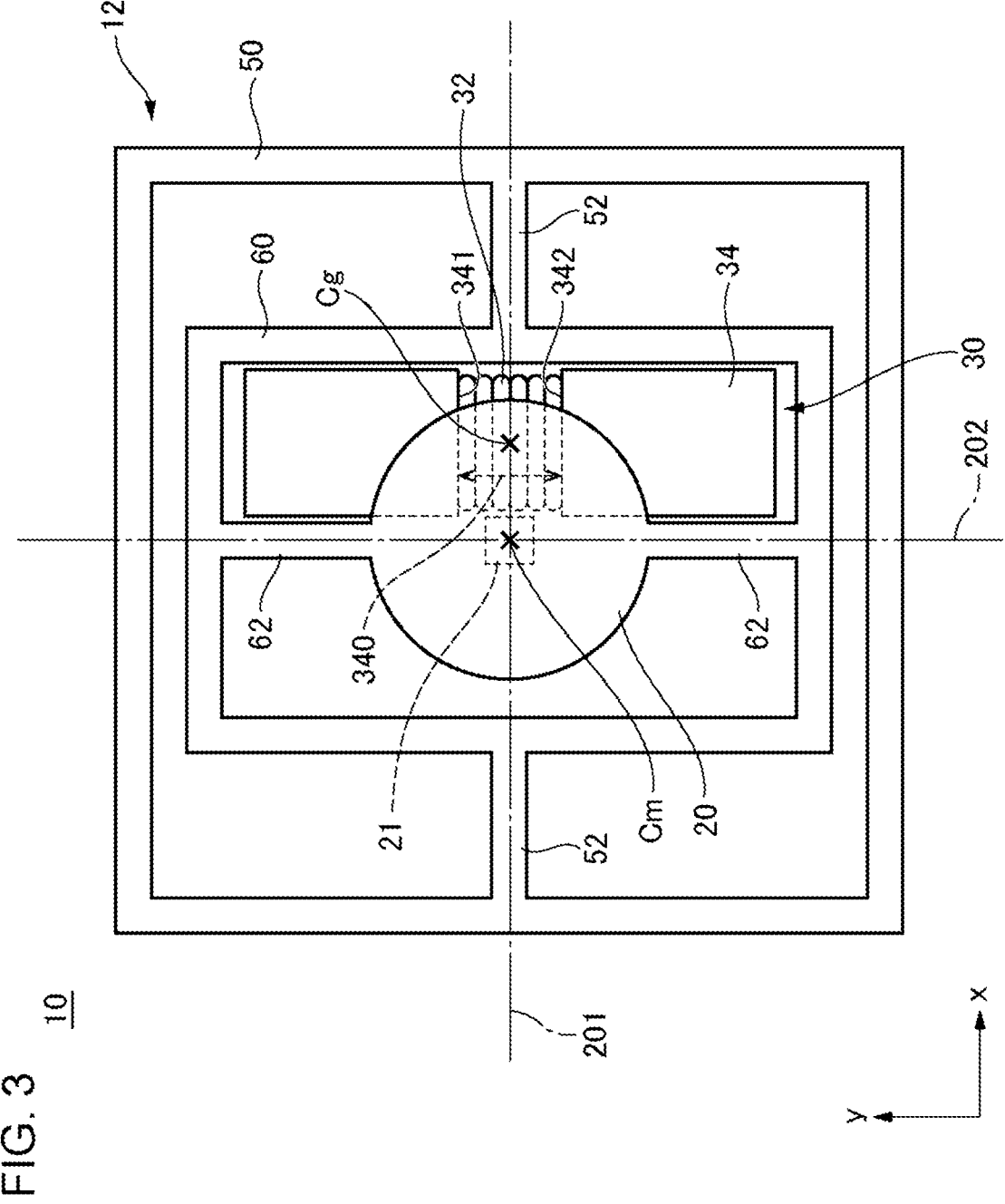
FIG. 3 is a diagram illustrating a configuration of the actuator according to the embodiment.

FIGS. 1 to 3 are diagrams illustrating the configuration of an actuator 10 according to an embodiment. FIG. 1 is a perspective view of the actuator 10, FIG. 2 is a side view of the actuator 10, and FIG. 3 is a plan view of the actuator 10. The x-axis, y-axis and z-axis shown in each figure are three axes orthogonal to each other. The actuator 10 according to the present embodiment includes a mirror 20 and an electromagnet 30. The mirror 20 is provided with a permanent magnet 21. The mirror 20 is capable of oscillating about the first axis 201 and the second axis 202 as oscillation axes with respect to the reference plane 101. The second axis 202 is non-parallel to the first axis 201. The electromagnet 30 has a yoke 34 and a coil 32 and applies a magnetic flux to the permanent magnet 21. Both ends (end portion 341 and end portion 342) of the yoke 34 face each other at least partially across a gap 340. When viewed from a direction perpendicular to the reference plane 101 (the z-axis direction), the center Cg of the gap 340 does not overlap the center Cm of the permanent magnet 21. A current $I_1$ for causing the mirror 20 to oscillate with respect to the first axis 201 and a current $I_2$ for causing the mirror 20 to oscillate with respect to the second axis 202 are superimposed and flowed through the coil 32. A detailed description will be made below.

Oscillating the mirror 20 with respect to the first axis 201 refers to oscillating the mirror 20 about the first axis 201 as the oscillation axis, and oscillating the mirror 20 with respect to the second axis 202 refers to oscillating the mirror 20 about the second axis 202 as the oscillation axis.

The mirror 20 has a reflecting surface 22 and the permanent magnet 21 is fixed at the center of the surface opposite to the reflecting surface 22. The first pole 211, which is one of the poles of the permanent magnet 21, faces the mirror 20 side, and the second pole 212, which is the other pole of the permanent magnet 21, faces the opposite side of the mirror 20, that is, the side where the electromagnet 30 is provided. The reference plane 101 is a plane including the reflecting surface 22 of the mirror 20 in a state in which no current is flowing through the coil of the electromagnet 30, that is, in a reference state in which the permanent magnet 21 receives no force. FIGS. 1 to 3 all show the reference state. The reference plane 101 is parallel to the xy plane.

The actuator 10 is a biaxial actuator and can oscillate the mirror 20 with respect to the first axis 201 and the second axis 202. Thereby, the direction of the light reflected by the reflecting surface 22 of the mirror 20 can be changed two-dimensionally. In the present embodiment, the first axis 201 and the second axis 202 are substantially orthogonal or orthogonal to each other.

In the electromagnet 30, the coil 32 is wound around at least a portion of yoke 34. As current flows through the coil 32, a magnetic flux is generated between an end portion 341 and an end portion 342. By applying this magnetic flux to the permanent magnet 21, it is possible to oscillate the mirror 20 with respect to the first axis 201 and the second axis 202.

In the actuator 10 according to the present embodiment, the driving of the mirror 20 with respect to the first axis 201 and the driving of the mirror with respect to the second axis 202 are realized using the same electromagnet 30. That is, the electromagnet for causing the mirror 20 to oscillate with respect to the first axis 201 and the electromagnet for causing the mirror 20 to oscillate with respect to the second axis 202 are not separated. By doing so, it is possible to reduce the size of the actuator 10 without providing electromagnets for each of the plurality of oscillation axes.

The electromagnet 30 is U-shaped or C-shaped. Specifically, both ends (end portion 341 and end portion 342) of the yoke 34 of the electromagnet 30 face each other across at least a portion of the permanent magnet 21 when viewed from a direction perpendicular to the reference plane 101. The end portion 341 and the end portion 342 are end portions where a magnetic flux is generated. The electromagnet 30 may be composed of a plurality of electromagnets which are configured such that the end portions where a magnetic flux is generated face each other at least partially across a gap 340. That is, the yoke 34 and the coil 32 of the electromagnet 30 may be divided into a plurality of parts. In the examples of FIGS. 1 to 3, the end portion 341 and the end portion 342 are closer to the mirror 20 than the coil 32 is. Also, the coil 32 extends in a direction parallel to the reference plane 101.

Next, with reference to FIGS. 1 and 3, a structural body 12 including a mirror 20, an outer frame 50, and an inner frame 60 will now be described. The actuator 10 further includes an outer frame 50, a torsion bar 52, an inner frame 60 and a torsion bar 62. The outer frame 50 and the inner frame 60 are connected via two torsion bars 52. The inner frame 60 and the mirror 20 are connected via two torsion bars 62. The outer frame 50, the torsion bars 52, the inner frame 60, the torsion bars 62, and the mirror 20 are integrally constructed by, for example, microfabrication of a semiconductor wafer, and the actuator 10 is a MEMS actuator. In the present embodiment, the electromagnet 30 is positioned entirely on one side of the structural body 12 including the outer frame 50, the torsion bars 52, the inner frame 60, the torsion bars 62 and the mirror 20.

For example, the outer frame 50 is fixed with respect to the housing (not shown) of the actuator 10. The inner frame 60 is capable of oscillating about the first axis 201 as the oscillation axis with respect to the outer frame 50. Two torsion bars 52 coincide with the first axis 201. That is, the two torsion bars 52 overlap along the first axis 201, and as the torsion bars 52 twist, the inner frame 60 oscillates with respect to the outer frame 50. Also, the mirror 20 is capable of oscillating about the second axis 202 as the oscillation axis with respect to the inner frame 60. Two torsion bars 62 coincide with the second axis 202. That is, the two torsion bars 62 overlap along the second axis 202, and as the torsion bars 62 twist, the mirror 20 oscillates with respect to the inner frame 60. In the reference state described above, the torsion bars 52 and the torsion bars 62 are not twisted, and one surface of the outer frame 50, the inner frame 60, and the mirror 20 are positioned on the same plane as the reference plane 101.

Figure 5:
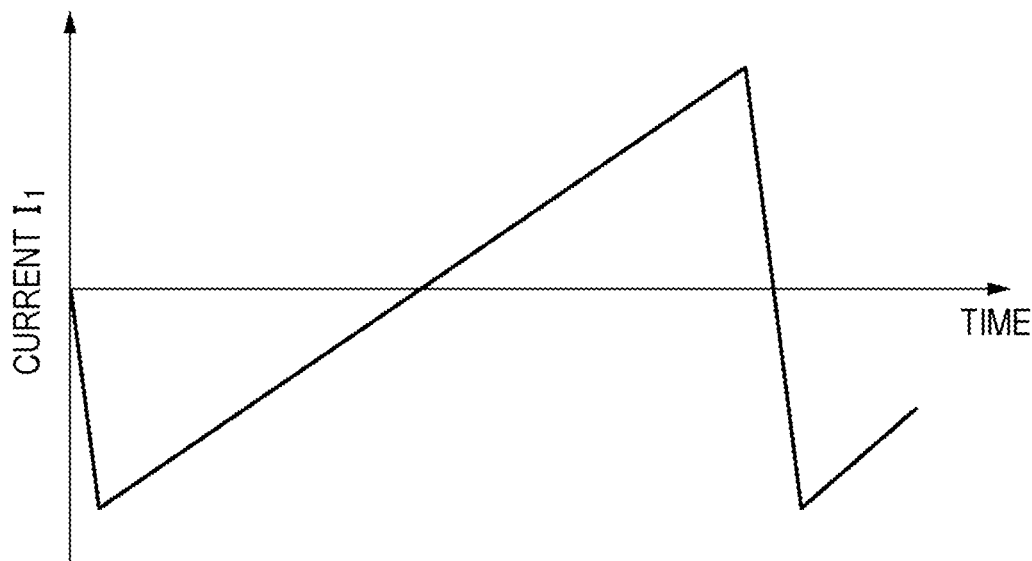
FIG. 5 is a graph illustrating a waveform of a current for causing a mirror to oscillate with respect to the first axis.
Figure 6:
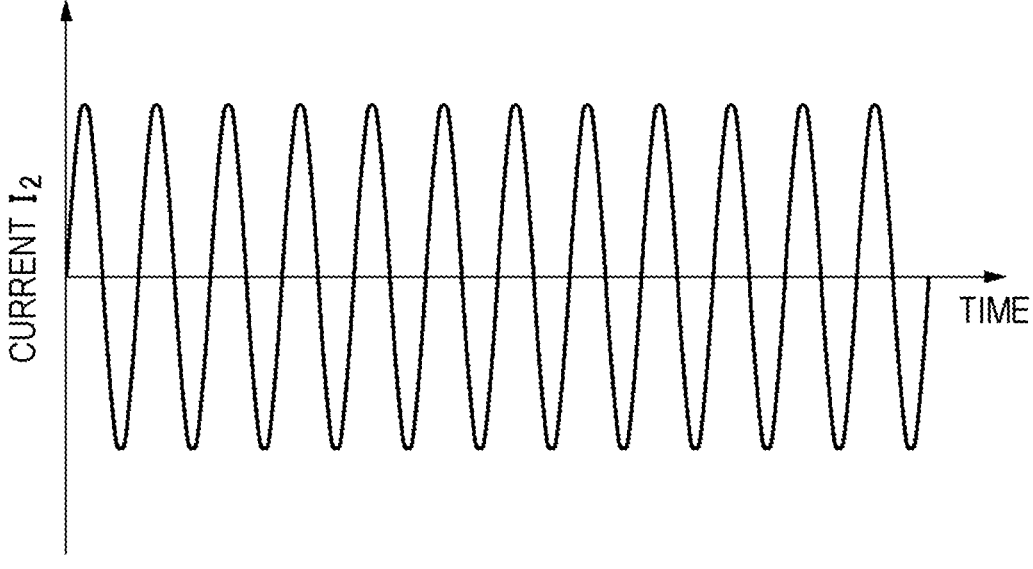
FIG. 6 is a graph illustrating a waveform of a current for causing a mirror to oscillate with respect to the second axis.

Driving of the actuator 10 by the electromagnet 30 will now be described with reference to FIGS. 1 to 3, 5 and 6. First, driving about the first axis 201 as the oscillation axis will be described. When current flows through the coil 32 of the electromagnet 30, a magnetic flux is generated between the end portion 341 and the end portion 342. At this time, the end portion 341 and the end portion 342 are opposite poles to each other. Then, the orientation of the mirror 20 changes so that the permanent magnet 21 is directed toward an end portion side that is of opposite polarity to the second pole 212, of the end portion 341 and the end portion 342. For example, when the current $I_1$ flows through the coil 32 of the electromagnet 30 as shown in FIG. 5, which will be described later, the orientation of the mirror 20 changes each time the polarity of the current switches from positive to negative or from negative to positive. Next, driving about the second axis 202 as the oscillation axis will be described. When current flows through the coil 32 of the electromagnet 30, the electromagnet 30 pulls the permanent magnet 21 into the gap 340 side, and the torsion bars 62 along the second axis 202 are twisted. Since the twisted torsion bars try to return to their original state, the permanent magnet 21 moves away from the gap 340 when the magnitude of the current flowing through the coil 32 decreases. For example, when the current $I_2$ is flowed through the coil 32 of the electromagnet 30 at the resonance frequency of the mirror 20 as shown in FIG. 6, which will be described later, the mirror 20 oscillates at the resonance frequency together with the permanent magnet 21. Therefore, the orientation of the reflecting surface 22 of the mirror 20 can be controlled by changing the polarity and magnitude of the current flowing through the coil 32.

In the actuator 10 according to the present embodiment, the end portion 341 and the end portion 342 have end surfaces perpendicular to the second axis 202. The end portion 341 and the end portion 342 of the yoke 34 face each other in a direction parallel to the second axis 202 (y-axis direction). By doing so, it is possible to reduce crosstalk between the oscillating with respect to the first axis 201 and the oscillating with respect to the second axis 202. However, the yoke 34 may be arranged such that both ends obliquely face each other with respect to the second axis 202. Also, the end portion 341 and the end portion 342 may have end surfaces perpendicular to the first axis 201. The end portion 341 and the end portion 342 of the yoke 34 may face each other in a direction parallel to the first axis 201 (x-axis direction). The yoke 34 may be arranged such that both ends obliquely face each other with respect to the first axis 201.

In a case where the end portion 341 and the end portion 342 of the yoke 34 face each other in a direction parallel to the second axis 202 (y-axis direction), the torque that can be generated for driving about the second axis 202 as the oscillation axis is smaller than the torque that can be generated for driving about the first axis 201 as the oscillation axis. In contrast, in the present embodiment, the mirror 20 is driven to oscillate at the resonance frequency with respect to the second axis 202. Therefore, it is possible to sufficiently oscillate the mirror 20 even with a relatively small driving torque.

Further, in the actuator 10 according to the present embodiment, as described above, the center Cg of the gap 340 does not overlap the center Cm of the permanent magnet 21 when viewed from a direction (z-axis direction) perpendicular to the reference plane 101. Specifically, when viewed from a direction perpendicular to the reference plane 101, the center of the gap 340 is deviated from the center of the permanent magnet 21 in the direction parallel to the first axis 201 (x-axis direction). By doing so, it is possible to increase the torque for causing the mirror 20 to oscillate about the second axis 202 as the oscillation axis. On the other hand, the center of the gap 340 is not deviated from the center of the permanent magnet 21 in the direction perpendicular to the first axis 201 (y-axis direction). By doing so, it is possible to reduce crosstalk between the oscillating with respect to the first axis 201 and the oscillating with respect to the second axis 202. However, the gap 340 may be deviated from the center of the permanent magnet 21 in an oblique direction with respect to the first axis 201 or may be deviated from the center of the permanent magnet 21 in an oblique direction with respect to the second axis 202.

The actuator 10 further includes a control unit 70. The control unit 70 generates a signal in which the current $I_1$ for causing the mirror 20 to oscillate with respect to the first axis 201 and the current $I_2$ for causing the mirror 20 to oscillate with respect to the second axis 202 are superimposed. The control unit 70 is configured by including, for example, a driving circuit 72 and an integrated circuit 40.

Figure 4:
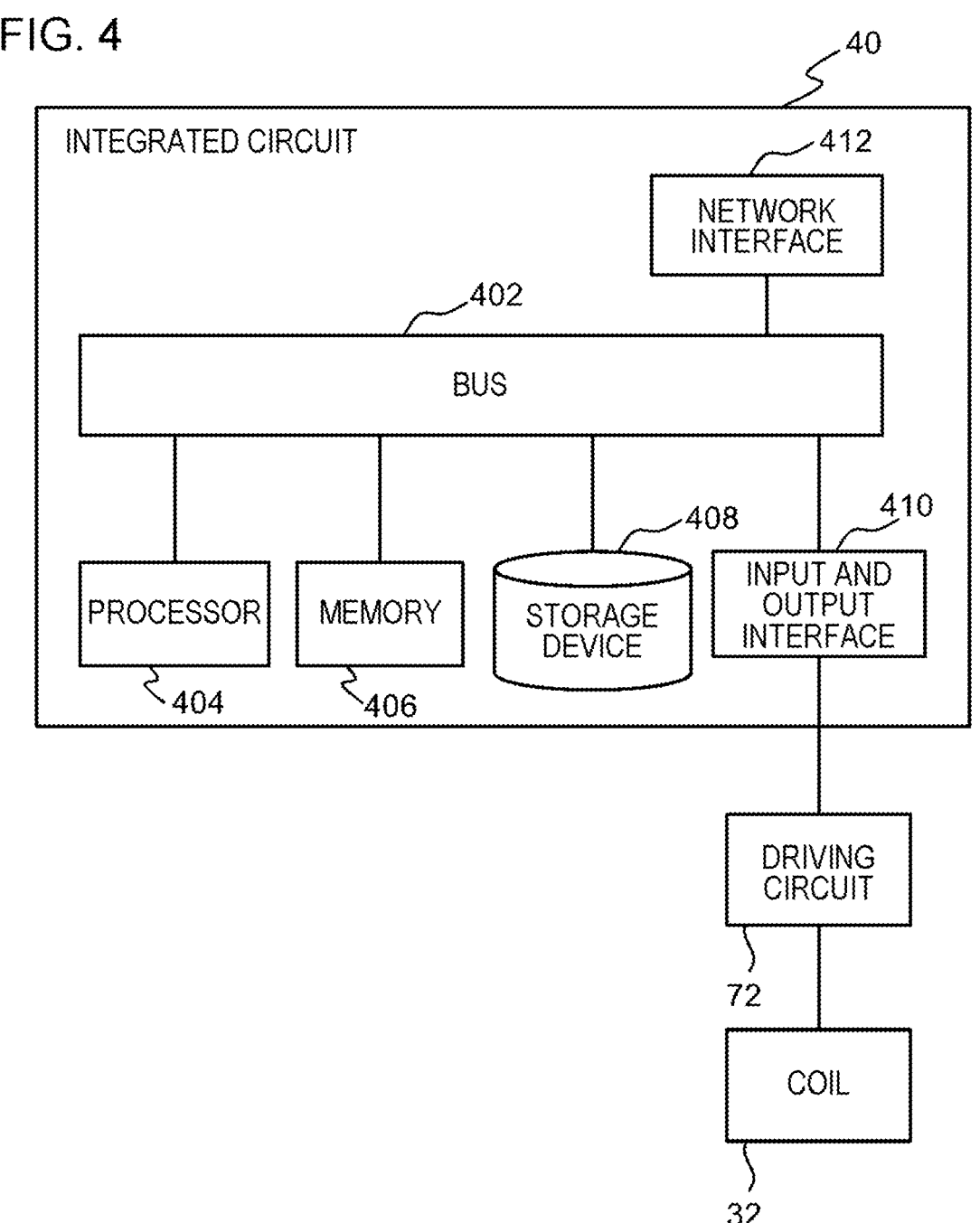
FIG. 4 is a diagram illustrating a hardware configuration of a control unit.

FIG. 4 is a diagram illustrating a hardware configuration of the control unit 70. In this figure, the control unit 70 is implemented using the integrated circuit 40. The integrated circuit 40 is, for example, a system on chip (SoC). The control unit 70 is configured by including an integrated circuit 40 and a driving circuit 72.

The integrated circuit 40 includes a bus 402, a processor 404, a memory 406, a storage device 408, an input and output interface 410, and a network interface 412. The bus 402 is a data transmission line for the processor 404, the memory 406, the storage device 408, the input and output interface 410, and the network interface 412 to transmit and receive data to and from each other. A method of connecting the processor 404 and the like to each other is not limited to the bus connection. The processor 404 is an arithmetic processing unit realized using a microprocessor or the like. The memory 406 is a memory realized using a random access memory (RAM) or the like. The storage device 408 is a storage device realized using a read only memory (ROM), a flash memory, or the like.

The input and output interface 410 is an interface for connecting the integrated circuit 40 to peripheral devices. In the present figure, at least the driving circuit 72 is connected to the input and output interface 410.

The network interface 412 is an interface for connecting the integrated circuit 40 to a communication network. Such a communication network is, for example, a controller area network (CAN) communication network. A method of connecting the network interface 412 to the communication network may be a wireless connection or a wired connection.

The storage device 408 stores program modules for realizing the functions of the control unit 70. The processor 404 realizes the function of the control unit 70 by reading this program module into the memory 406 and executing the program module.

The hardware configuration of the integrated circuit 40 is not limited to the configuration shown in the present figure. For example, the program module may be stored in the memory 406. In this case, the integrated circuit 40 may not include the storage device 408.

Figure 7:
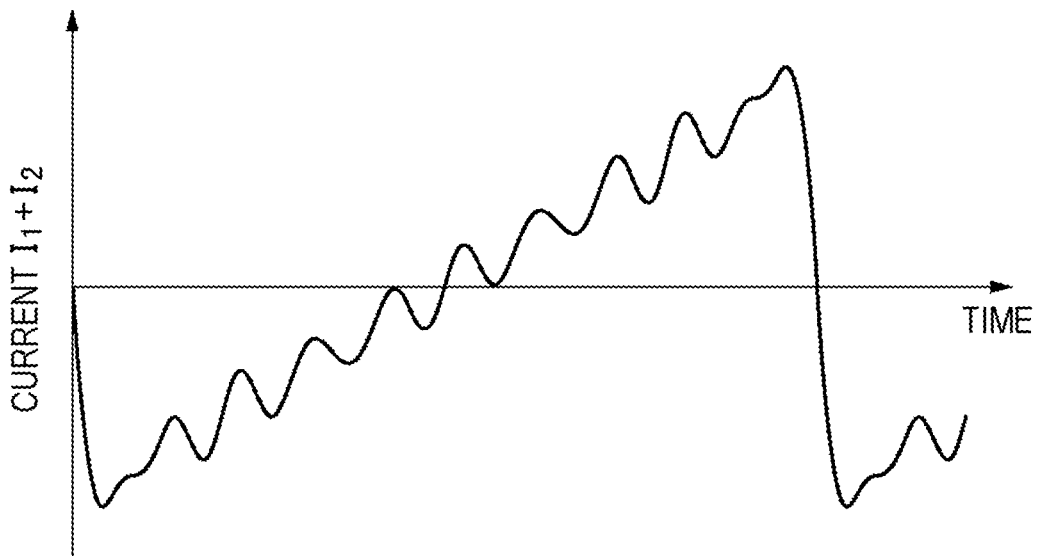
FIG. 7 is a graph illustrating a waveform of the current in which the current for causing the mirror to oscillate with respect to the first axis and the current for causing the mirror to oscillate with respect to the second axis are superimposed.

FIG. 5 is a graph illustrating a waveform of the current $I_1$ for causing the mirror 20 to oscillate with respect to the first axis 201. FIG. 6 is a graph illustrating a waveform of the current $I_2$ for causing the mirror 20 to oscillate with respect to the second axis 202. FIG. 7 is a graph illustrating a waveform of the current $(I_1+I_2)$ obtained by superimposing the current for causing the mirror 20 to oscillate with respect to the first axis 201 and the current for causing the mirror 20 to oscillate with respect to the second axis 202.

The current $I_1$ for causing the mirror 20 to oscillate with respect to the first axis 201 is, for example, a sawtooth wave or a triangular wave. The current $I_2$ for causing the mirror 20 to oscillate with respect to the second axis 202 is, for example, a sine wave. As described above, the mirror 20 is driven to oscillate at the resonance frequency with respect to the second axis 202. The control unit 70 generates the driving current $(I_1+I_2)$, in which the current $I_1$ and the current $I_2$ are superimposed, and the driving current is flowed from the control unit 70 to the coil 32. By using the driving current as shown in FIG. 7, the mirror 20 can be driven so that the light reflected by the reflecting surface 22 performs raster scanning. However, the waveforms of the current $I_1$ and the current $I_2$ are not limited to the examples shown in FIGS. 5 and 6.

As described above, according to the present embodiment, the center Cg of the gap 340 does not overlap the center Cm of the permanent magnet 21 when viewed from a direction perpendicular to the reference plane 101. Therefore, it is possible to realize the driving of the mirror 20 with respect to the first axis 201 and the driving of the mirror with respect to the second axis 202 using the same electromagnet 30. As a result, it is possible to miniaturize the actuator 10.

EXAMPLES

Figure 8:
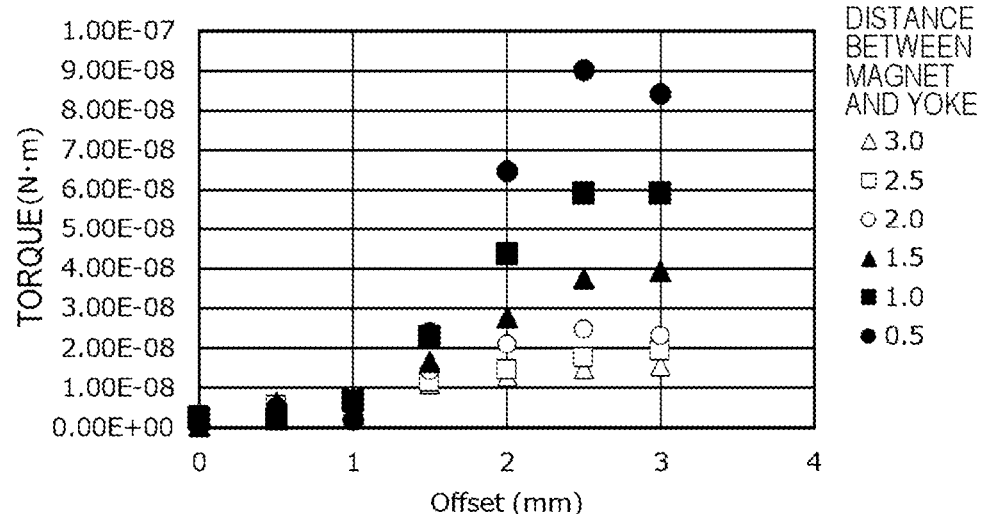
FIG. 8 is a graph showing a result of simulating the relationship between the position of the electromagnet and the generated torque.

FIG. 8 is a graph showing a result of simulating the relationship between the position of the electromagnet 30 and the generated torque. In the structure shown in FIGS. 1 to 3, the simulation was performed by changing the distance between the permanent magnet 21 and the yoke 34 to a plurality of values (the unit in FIG. 8 is mm) in the z direction. The horizontal axis of the graph is the distance (offset) between the center Cg of the gap 340 and the center Cm of the permanent magnet 21 as seen from the z-axis direction. The vertical axis of the graph is the magnitude of the torque generated by the electromagnet 30 that oscillates the mirror 20 with respect to the second axis 202.

As shown in the present figure, in a case where there is no offset of the center Cg with respect to the center Cm, the torque was almost 0 regardless of the distance between the permanent magnet 21 and the yoke 34. On the other hand, as the offset increased, the torque gradually increased and peaked at an offset of 2.5 mm.

Figure 9:
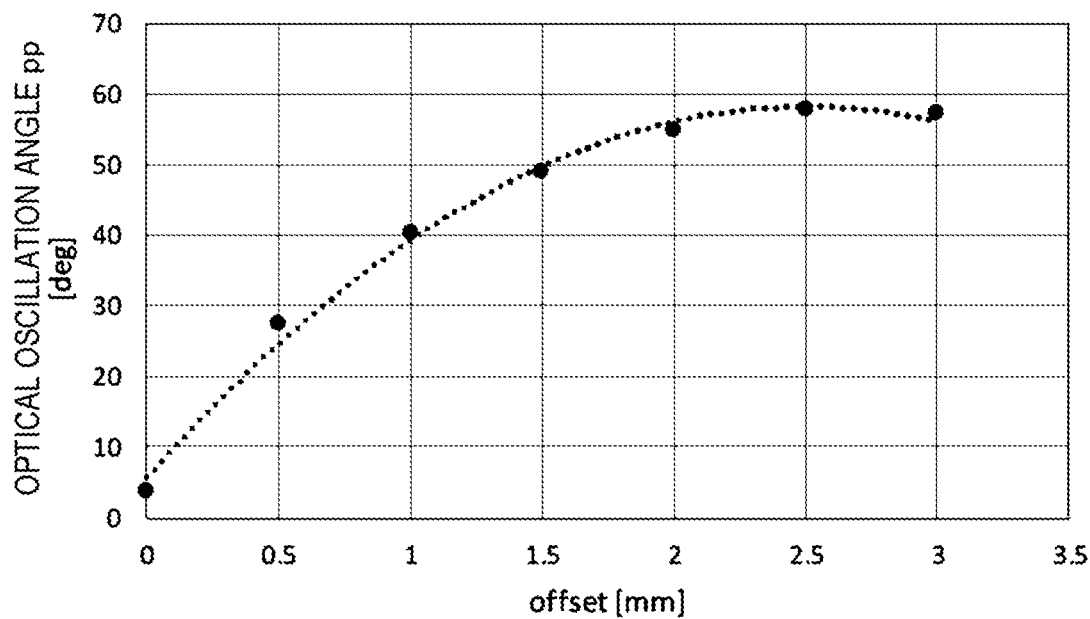
FIG. 9 is a graph showing a result of measuring the relationship between the position of the electromagnet and the amplitude of the mirror.

FIG. 9 is a graph showing a result of measuring the relationship between the position of the electromagnet 30 and the amplitude of the mirror. In the structure shown in FIGS. 1 to 3, the mirror 20 was oscillated with respect to the second axis 202 and the oscillation amplitude was measured. The measurements were performed for a plurality of offset values, and the driving signal was the same sine wave. When the offset was 2.5 mm, as shown in the present figure, it was possible to oscillate the mirror by nearly 60° in terms of optical oscillation angle.

As above, the embodiment and the examples are described with reference to the drawings, but these are examples of the present invention, and various other configurations other than the embodiment and the examples described above can be adopted.

This application claims priority based on Japanese Patent Application No. 2021-032420 filed on Mar. 2, 2021, the entire disclosure of which is incorporated herein by reference.

REFERENCE SIGNS LIST

10 Actuator
12 Structural body
20 Mirror
21 Permanent magnet
22 Reflecting surface
30 Electromagnet
32 Coil
34 Yoke
40 Integrated circuit
50 Outer frame
52 Torsion bar
60 Inner frame
62 Torsion bar
70 Control unit
72 Driving circuit
101 Reference plane
201 First axis
202 Second axis
340 Gap
341 End portion
342 End portion

The invention claimed is:

1. An actuator comprising:
a mirror provided with a permanent magnet, and capable of oscillating about a first axis and a second axis non-parallel to the first axis as oscillation axes with respect to a reference plane; and
an electromagnet having a yoke and a coil and applying a magnetic flux to the permanent magnet,
wherein both ends of the yoke face each other at least partially across a gap,
when viewed from a direction perpendicular to the reference plane, a center of the gap does not overlap a center of the permanent magnet,
a current for causing the mirror to oscillate with respect to the first axis and a current for causing the mirror to oscillate with respect to the second axis are superimposed and flowed through the coil such that driving of the mirror with respect to the first axis and the driving of the mirror with respect to the second axis are realized using a same electromagnet including the coil, and
the both ends of the yoke face each other along a direction parallel to the first axis or the second axis, and when the current flows through the coil, the both ends become opposite poles, generating a magnetic flux between the both ends.

2. The actuator according to claim 1,
wherein the mirror is driven to oscillate at a resonance frequency with respect to the second axis, and
the both ends of the yoke face each other in a direction parallel to the second axis.

3. The actuator according to claim 1,
wherein when viewed from the direction perpendicular to the reference plane, the center of the gap is deviated from the center of the permanent magnet in a direction parallel to the first axis.

4. The actuator according to claim 1,
wherein the current for causing the mirror to oscillate with respect to the first axis is a sawtooth wave or a triangular wave, and
the current for causing the mirror to oscillate with respect to the second axis is a sine wave.

5. The actuator according to claim 1 further comprising:
a control unit configured to generate a signal in which the current for causing the mirror to oscillate with respect to the first axis and the current for causing the mirror to oscillate with respect to the second axis are superimposed.

6. The actuator according to claim 1,
wherein the actuator is a MEMS actuator.

7. The actuator according to claim 1, wherein
the electromagnet is positioned entirely on one side of the mirror.

8. The actuator according to claim 1, wherein
the reference plane is a plane including a reflecting surface of the mirror in a state in which no current is flowing through the coil of the electromagnet.

9. The actuator according to claim 1, wherein
the electromagnet for causing the mirror to oscillate with respect to the first axis and the electromagnet for causing the mirror to oscillate with respect to the second axis are not separated.

10. The actuator according to claim 3, wherein
the center of the gap is not deviated from the center of the permanent magnet in a direction perpendicular to the first axis.

11. An actuator comprising:
a mirror provided with a permanent magnet, and capable of oscillating about a first axis and a second axis non-parallel to the first axis as oscillation axes with respect to a reference plane; and
a single electromagnet having a yoke and a coil and applying a magnetic flux to the permanent magnet,
wherein both ends of the yoke face each other at least partially across a gap,
when viewed from a direction perpendicular to the reference plane, a center of the gap does not overlap a center of the permanent magnet,
a current for causing the mirror to oscillate with respect to the first axis and a current for causing the mirror to oscillate with respect to the second axis are superimposed and flowed through the coil, and
the single electromagnet is an only electromagnet in the actuator.

\* \* \* \* \*